United States Patent [19]

Suzuki et al.

[11] Patent Number: 4,672,434
[45] Date of Patent: Jun. 9, 1987

[54] STEREOSCOPIC TELEVISION SYSTEM AND APPARATUS WITH 4 TO 1 INTERLACE DISPLAY

[75] Inventors: Kiyoaki Suzuki, Zama; Makoto Iwahara, Sagamihara; Hidetsugu Suzuki, Sagamihara; Atsushi Sakamoto, Sagamihara, all of Japan

[73] Assignee: Victor Company of Japan, Ltd., Japan

[21] Appl. No.: 838,385

[22] Filed: Mar. 11, 1986

[30] Foreign Application Priority Data

Mar. 15, 1985 [JP] Japan .................................. 60-51929

[51] Int. Cl.$^4$ ............................................. H04N 13/00
[52] U.S. Cl. ...................................... 358/88; 358/91; 358/92; 358/152
[58] Field of Search .................. 358/3, 88, 91, 92, 152

[56] References Cited

U.S. PATENT DOCUMENTS

| | | | |
|---|---|---|---|
| 4,310,849 | 1/1982 | Glass | 358/88 |
| 4,322,750 | 3/1982 | Lord et al. | 358/140 |
| 4,393,400 | 7/1983 | Ikushima | 358/92 |
| 4,562,463 | 12/1985 | Lipton | 358/92 |

FOREIGN PATENT DOCUMENTS 3234557  3/1984  Fed. Rep. of Germany .......... 358/3

Primary Examiner—John W. Shepperd
Attorney, Agent, or Firm—Andrus, Sceales, Starke & Sawall

[57] ABSTRACT

A stereoscopic television system and apparatus comprise a memory for storing right-eye information related to odd and even fields and left-eye information related to the odd and even fields, a circuit for producing a main scanning direction synchronizing signal for synchronizing a scanning in a vertical direction of a reproduced picture and a sub scanning direction synchronizing signal for synchronizing a scanning in a horizontal direction of the reproduced picture, where the sub scanning direction synchronizing signal has a frequency which is $m \pm \frac{1}{4}$ times a frequency of the main scanning direction synchronizing signal and m is a natural number, and a display device for reproducing and displaying in synchronism with the main and sub scanning direction synchronizing signals the right-eye information related to the odd and even fields and the left-eye information related to the odd and even fields which are successively read out from the memory in synchronism with the main scanning direction synchronizing signal.

11 Claims, 9 Drawing Figures

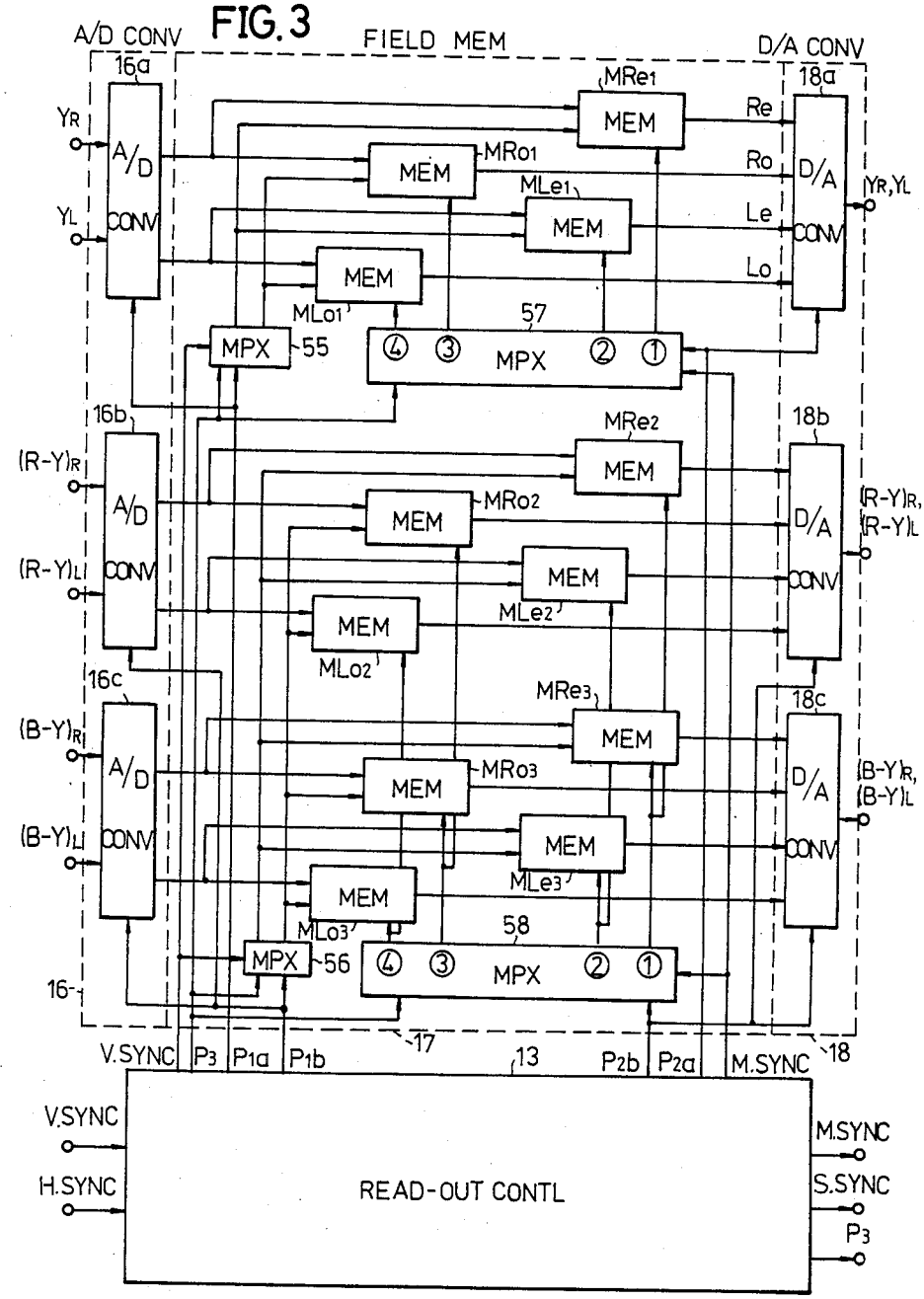

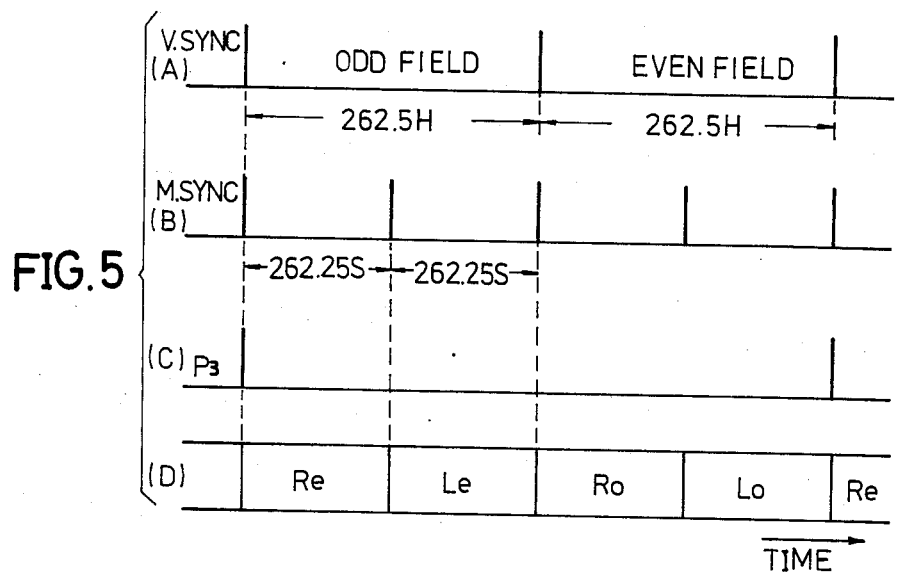
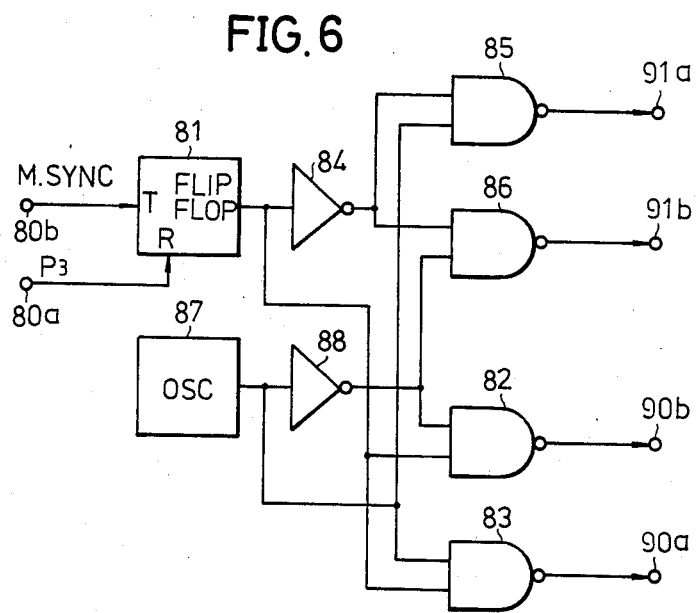

STEREOSCOPIC TELEVISION SYSTEM AND APPARATUS WITH 4 TO 1 INTERLACE DISPLAY

BACKGROUND OF THE INVENTION

The present invention generally relates to stereoscopic television systems and apparatuses for obtaining a stereoscopic reproduced picture by time-divisionally and successively reproducing right-eye informatiion and left-eye information, and more particularly to stereoscopic television system and apparatus which improve the apparent picture quality of the reproduced picture.

Conventionally, various stereoscopic television apparatuses have been proposed for obtaining a stereoscopic reproduced picture in conformance with respective stereoscopic systems. In an example of such a conventional stereoscopic television apparatus, right-eye information and left-eye information are alternately and successively reproduced time-divisionally with a predetermined period. A pair of shutters are provided in front of the right and left eyes of the viewer, and the pair of shutters are alternately opened and closed in synchronism with the predetermined period so that the viewer sees a stereoscopic reproduced picture.

In the conventional stereoscopic television apparatus of the type described above, the predetermined period is an inverse of the frame frequency and is 1/30 second in the case of the NTSC system, for example. The right-eye information and the left-eye information are alternately reproduced for every one field. Furthermore, the pair of shutters are alternately opened and closed with a period of 1/30 second. Accordingly, the left eye of the viewer always sees the odd fields and the right eye always sees the even fields, for example. For this reason, the left eye does not see the information related to the even fields and the right eye does not see the information related to the odd fields, and there is a problem in that the picture quality of the reproduced picture is unsatisfactory. In addition, since the information related to the reproduced picture is alternately supplied to each eye for every 1/30 second, there is a problem in that a flicker is introduced in the reproduced picture which is seen by the viewer.

SUMMARY OF THE INVENTION

Accordingly, it is a general object of the present invention to provide novel and useful stereoscopic television system and apparatus in which the problems described heretofore are eliminated.

Another and more specific object of the present invention is to provide a stereoscopic television system which comprises memory means for storing right-eye information related to odd and even fields and left-eye information related to the odd and even fields, synchronizing signal producing means for producing a main scanning direction synchronizing signal for synchronizing a scanning in a vertical direction of a reproduced picture and a sub scanning direction synchronizing signal for synchronizing a scanning in a horizontal direction of the reproduced picture, where the sub scanning direction synchronizing signal has a frequency which is $m \pm \frac{1}{4}$ times a frequency of the main scanning direction synchronizing signal and m is a natural number, and display means for reproducing and displaying in synchronism with the main and sub scanning direction synchronizing signals the right-eye information related to the odd and even fields and the left-eye information related to the odd and even fields which are successively read out from the memory means in synchronism with the main scanning direction synchronizing signal. According to the stereoscopic television system of the present invention, it is possible to supply to the right and left eyes of the viewer the information related to all of the fields, and a raster interval between a raster of a picture reproduced from the right-eye information and a raster of a picture reproduced from the left-eye information can be made ½ that of the conventional system. In addition, the interlacing of the picture information with respect to the right and left eyes can be accurately maintained, and the apparent picture quality of the reproduced picture is improved.

Still another object of the present invention is to provide a stereoscopic television apparatus which comprises memory means for independently storing right-eye information related to an odd field, right-eye information related to an even field, left-eye information related to the odd field and left-eye information related to the even field, write-in means for writing the right-eye information and the left-eye information which are supplied thereto in parallel into the memory means for each of the odd and even fields, synchronizing signal producing means for producing a main scanning direction synchronizing signal for synchronizing a scanning in a vertical direction of a reproduced picture and a sub scanning direction synchronizing signal for synchronizing a scanning in a horizontal direction of the reproduced picture, where the main scanning direction synchronizing signal has a frequency which is two times a frequency of a vertical synchronizing signal of the right-eye information and the left-eye information, a number of periods of the sub scanning direction synchronizing signal in one period of the main scanning direction synchronizing signal is equal to a number of periods of a horizontal synchronizing signal in one period of the vertical synchronizing signal plus or minus $(2n-1)/4$ and n is a natural number, read-out means for successively and serially reading out from the memory means in synchronism with the main scanning direction synchronizing signal the right-eye information and the left-eye information related to an even field or an odd field during a time period in which the right-eye information and the left-eye information related to an odd field or an even field are written into the memory means, and display means for reproducing and displaying in synchronism with the main and sub scanning direction synchronizing signals the right-eye information and the left-eye information which are successively read out from the memory means. According to the stereoscopic television apparatus of the present invention, it is possible to supply to the right and left eyes of the viewer the information related to all of the fields. In addition, the interlacing of the picture information with respect to the right and left eyes can be accurately maintained, and the apparent picture quality of the reproduced picture is improved.

A further object of the present invention is to provide a stereoscopic television apparatus in which right-eye information and left-eye information related to an even field or an odd field are successively and serially read out from memory means during a time period in which the right-eye information and the left-eye information related to an odd field or an even field are written into the memory means in parallel. According to the stereoscopic television apparatus of the present invention, it is possible to simultaneously perform the write-in and the read-out of the right-eye information and the left-eye information.

Another object of the present invention is to provide a stereoscopic television apparatus in which a main scanning direction synchronizing signal and a sub scanning direction synchronizing signal are produced so that a number of periods of the sub scanning direction synchronizing signal in one period of the main scanning direction synchronizing signal is equal to a number of periods of a horizontal synchronizing signal in one period of a vertical synchronizing signal minus ¼. According to the stereoscopic television apparatus of the present invention, a raster interval between a raster of a picture reproduced from the right-eye information and a raster of a picture reproduced from the left-eye information can be made ½ that of the conventional apparatus.

Still another object of the present invention is to provide a stereoscopic television apparatus in which a main scanning direction synchronizing signal is produced by frequency-multiplying a vertical synchronizing signal by use of a phase locked loop. According to the stereoscopic television apparatus of the present invention, it is possible to produce a main scanning direction synchronizing signal which is in synchronism with the vertical synchronizing signal and has a frequency which is two times a frequency of the vertical synchronizing signal.

A further object of the present invention is to provide a stereoscopic television apparatus in which a sub scanning direction synchronizing signal is produced by frequency-multiplying a vertical synchronizing signal by use of a phase locked loop. According to the stereoscopic television apparatus of the present invention, it is possible to produce a sub scanning direction synchronizing signal which is in synchronism with the vertical synchronizing signal and number of periods of the sub scanning direction synchronizing signal in one period of a main scanning direction synchronizing signal is accurately equal to $m \pm \frac{1}{4}$, where m is a natural number.

Other objects and further features of the present invention will be apparent from the following detailed description when read in conjunction with the accompanying drawings.

BRIEF DESCRIPTION OF THE DRAWINGS

FIG. 3 is a system block diagram showing an embodiment of an analog-to-digital converter, a field memory and a digital-to-analog converter in the apparatus shown in FIG. 1;

FIGS. 5(A) through 5(D) are timing charts for explaining an embodiment of a signal outputted by the read-out control circuit and information read out from the field memory;

FIG. 6 is a circuit diagram showing an embodiment of a driving circuit in the apparatus shown in FIG. 1;

DETAILED DESCRIPTION

Figure 1:
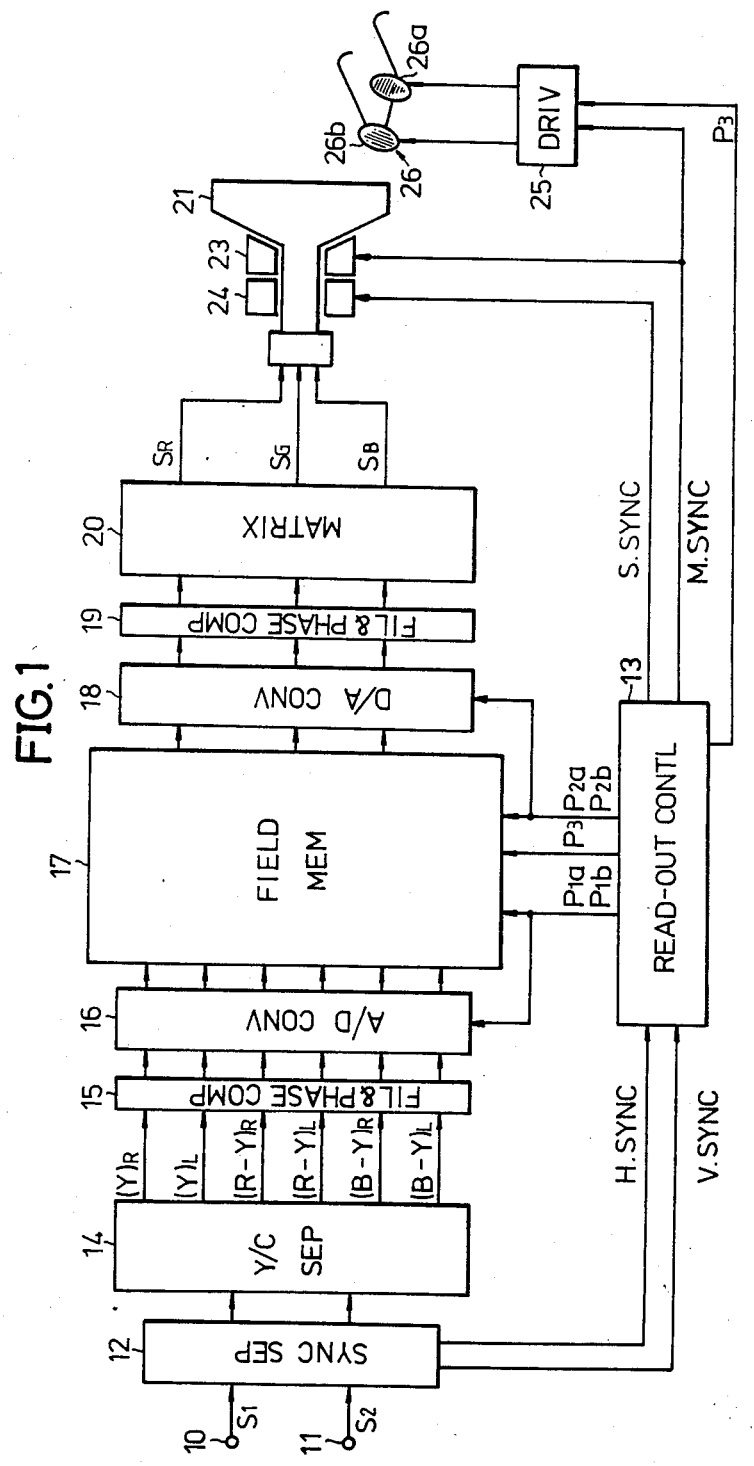
FIG. 1 is a system block diagram showing an embodiment of the stereoscopic television apparatus according to the present invention.

FIG. 1 is a system block diagram showing an embodiment of the stereoscopic television apparatus according to the present invention. In FIG. 1, a left-eye information signal S1 and a right-eye information signal S2 are applied to respective input terminals 10 and 11. For example, the information signals S1 and S2 are obtained from signal supplying sources such as a pair of television cameras, a pair of video tape recorders and a pair of video disc players. The information signals S1 and S2 are perfectly in synchronism with each other.

The information signals S1 and S2 are resepectively supplied to a synchronizing signal separating circuit 12 which separates horizontal and vertical synchronizing signals (H.SYNC and V.SYNC) and supplies these synchronizing signals to a read-out control circuit 13. The information signals S1 and S2 from the synchronizing signal separating circuit 12 are respectively supplied to a luminance signal/carrier chrominance signal (Y/C) separating circuit 14. The Y/C separating circuit 14 separates a frequency band of the information signal S1 so as to separate the information signal S1 into a luminance signal $Y_L$ and a carrier chrominance signal $C_L$. Similarly, the Y/C separating circuit 14 separates a frequency band of the information signal S2 so as to separate the information signal S2 into a luminance signal $Y_R$ and a carrier chrominance signal $C_R$. Furthermore, the Y/C separating circuit 14 demodulates the carrier chrominance signal $C_R$ into color difference signals $(R-Y)_R$ and $(B-Y)_R$ and demodulates the carrier chrominance signal $C_L$ into color difference signals $(R-Y)_L$ and $(B-Y)_L$. The luminance signals $Y_R$ and $Y_L$ and the color difference signals $(R-Y)_R$, $(B-Y)_R$, $(R-Y)_L$ and $(B-Y)_L$ are respectively supplied to a filter and phase compensation circuit 15.

The filter and phase compensation circuit 15 comprises a first lowpass filter part having a cutoff frequency (4.5 MHz) which is approximately ½ a sampling frequency (9 MHz) of the luminance signal so as to eliminate an unwanted high frequency component in each of the luminance signals $Y_R$ and $Y_L$. Further, the filter and phase compensation circuit 15 comprises a first phase compensation part for compensating a phase error introduced by the first lowpass filter part thereof. The filter and phase compensation circuit 15 also comprises a second lowpass filter part having a cutoff frequency (1.125 MHz) which is approximately ½ a sampling frequency (2.25MHz) of the color difference signals so as to eliminate an unwanted high frequency component in each of the color difference signals $(R-Y)_R$, $(B-Y)_R$, $(R-Y)_L$ and $(B-Y)_L$, and a second phase compensation part for compensating a phase error introduced by the second lowpass filter part.

The luminance signals $Y_R$ and $Y_L$ and the color difference signals $(R-Y)_R$, $(B-Y)_R$, $(R-Y)_L$ and $(B-Y)_L$ obtained from the filter and phase compensation circuit 15 are converted into digital signals in an analog-to-digital (A/D) converter 16. The digital signals from the A/D converter 16 are written into a filed memory 17 responsive to write-in pulses P1a and P1b having predetermined frequencies.

Next, the digital signals stored in the field memory 17 are respectively read out responsive to read-out pulses P2a and P2b having frequencies which are approximately two times the frequencies of the write-in pulses P1a and P1b, respectively. The stored digital signals are read out from the field memory 17 in a sequence of right-eye information Ro related to an odd field, left-eye information Lo related to the odd field, right-eye information Re related to an even field and left-eye information Le related to the even field. The digital signals read out from the field memory 17 are supplied to a digital-to-analog (D/A) converter 18.

The write-in pulses P1a and P1b and the read-out pulses P2a and P2b are respectively obtained from the read-out control circuit 13.

The digital signals supplied to the D/A converter 18 are converted back into the respective analog signals and are then supplied to a filter and phase compensation circuit 19. The filter and phase compensation circuit 19 comprises a first lowpass filter part having such a cutoff frequency (4.5 MHz) that an unwanted high frequency component in each of the luminance signals $Y_R$ and $Y_L$ is eliminated therein. Further, the filter and phase compensation circuit 19 comprises a first phase compensation part for compensating a phase error introduced by the first lowpass filter part thereof. The filter and phase compensation circuit 19 also comprises a second lowpass filter part having such a cutoff frequency (1.125 MHz) that an unwanted high frequency component in each of the color difference signals $(R-Y)_R$, $(B-Y)_R$, $(R-Y)_L$ and $(B-Y)_L$ is eliminated therein, and a second phase compensation part for compensating a phase error introduced by the second lowpass filter part.

The luminance signals $Y_R$ and $Y_L$ and the color difference signals $(R-Y)_R$, $(B-Y)_R$, $(R-Y)_L$ and $(B-Y)_L$ obtained from the filter and phse compensation circuit 19 are supplied to a matrix circuit 20 which produces color signals $S_R$, $S_G$ and $S_B$ of red (R), green (G) and blue (B), respectively. The color signals $S_R$, $S_G$ and $S_B$ are supplied to a display device 21 which reproduces and displays the information Ro, Lo, Re and Le.

Description will now be given with respect to the read-out control circuit 13, the A/D converter 16, the field memory 17 and the D/A converter 18 by referring to FIGS. 2 and 3.

Figure 2:
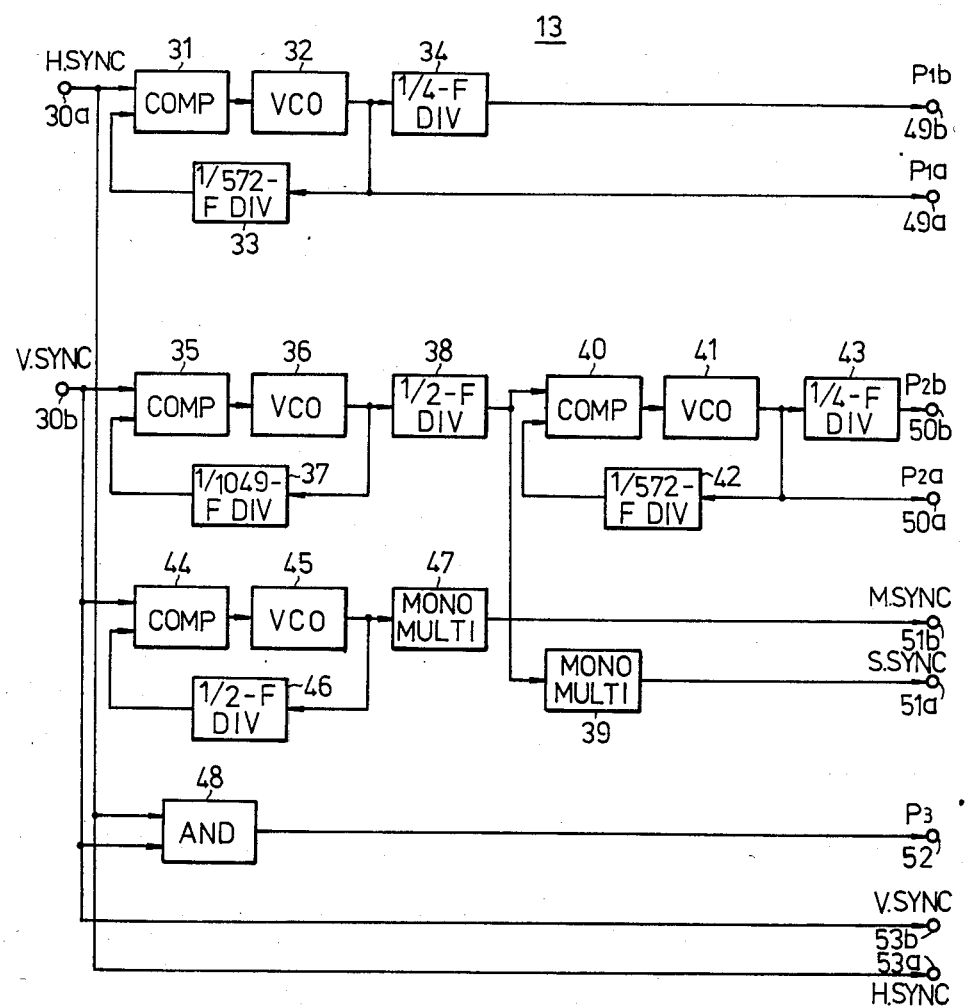
FIG. 2 is a circuit diagram showing an embodiment of a read-out control circuit in the apparatus shown in FIG. 1.

An embodiment of the read-out control circuit 13 is shown in FIG. 2. In FIG. 2, the horizontal synchronizing signal from the synchronizing signal separating circuit 12 is applied to a terminal 30a and is supplied to a phase comparator 31 which constitutes a phase locked loop (PLL) together with a voltage controlled oscillator (VCO) 32 and a 1/572-frequency divider 33. The VCO 32 produces write-in pulses P1a having a frequency of 9 MHz. The write-in pulses P1a from the VCO 32 are frequency-divided in a ¼-frequency divider 34 and write-in pulses P1b having a frequency of 2.25 MHz is produced from the ¼-frequency divider 34.

On the other hand, the vertical synchronizing signal from the synchronizing signal separating circuit 14 is applied to a terminal 30b and is supplied to phase comparator 35 which constitutes a PLL together with a VCO 36 and a 1/1049-frequency divider 37. An output signal of the VCO 36 is frequency-divided into a signal having a frequency of 31.47 kHz in a ½-frequency divider 38. The output signal of the ½-frequency divider 38 is formed into a sub scanning direction synchronizing signal (S.SYNC) having a predetermined pulse width in a monostable multivibrator 39. In addition, the output signal of the ½-frequency divider 38 is also supplied to a phase comparator 40 which constitutes a PLL together with a VCO 41 and a 1/572-frequency divider 42. Hence, read-out pulses P2a having a frequency of 18×1049/1050 MHz is produced from the VCO 41. The read-out pulses P2a are frequency-divided into read-out pulses P2b having a frequency of 4.5×1049/1050 MHz in a ¼-frequency divider 43. A value 1049/1050 represents a value [262.5−(¼)]/262.5.

The vertical synchronizing signal applied to the terminal 30b is also supplied to a phase comparator 44 which constitutes a PLL together with a VCO 45 and a ½-frequency divider 46. An output signal of the VCO 45 is formed into a main scanning direction synchronizing signal (M.SYNC) having a frequency of 120 Hz and a predetermined pulse width in a monostable multivibrator 47.

The horizontal and vertical synchronizing signals are also supplied to an AND circuit 48 which produces reset pulses P3 at starts of odd fields when rising edges of the horizontal and vertical synchronizing signals coincide.

Accordingly, the main scanning direction synchronizing signal has a phase relationship shown in FIG. 5(B) with respect to the vertical synchronizing signal having a waveform shown in FIG. 5(A). In the case where the information signals S1 and S2 employ a television system having 262.5 horizontal scanning periods (262.5 horizontal scanning lines) in one vertical scanning period, there are 262.25 periods in the sub scanning direction synchronizing signal in one period of the main scanning direction synchronizing signal. In FIGS. 5(A) and 5(B), H represents one horizontal scanning period and S represents one period of the sub scanning direction synchronizing signal. Hence, a number of scanning lines in the sub scanning direction in one period of the main scanning direction synchronizing signal is ¼ line less than 262.5 horizontal scanning lines corresponding to one field. Furthermore, the reset pulses P3 have a phase relationship shown in FIG. 5(C) with respect to the vertical synchronizing signal shown in FIG. 5(A).

The write-in pulses P1a and P1b produced by the circuit shown in FIG. 2 are respectively outputted through terminals 49a and 49b, and the read-out pulses P2a and P2b are respectively outputted through terminals 50a and 50b. The main and sub scanning direction synchronizing signals are respectively outputted through terminals 51a and 51b. The reset pulses P3 are outputted through a terminal 52. The horizontal and vertical synchronizing signals from the terminals 30a and 30b are respectively obtained as they are through terminals 53a and 53b.

In FIG. 3, the A/D converter 16 comprises an A/D converting circuit 16a for the luminance signals $Y_R$ and $Y_L$, an A/D converting circuit 16b for the color difference signals $(R-Y)_R$ and $(R-Y)_L$ and an A/D converting circuit 16c for the color difference signals $(B-Y)_R$ and $(B-Y)_L$. The A/D converting circuit 16a is supplied with the 9 MHz write-in pulses P1a from the read-out control circuit 13 as sampling pulses, and the A/D converting circuits 16b and 16c are respectively supplied with the 2.25 MHz write-in pulses P1b from the read-out control circuit 13 as sampling pulses.

The field memory 17 comprises memories MRo1 through MRo3, memories MRe1 through MRe3, memories MLo1 through MLo3, memories MLe1 through MLe3, and multiplexers 55 through 58. Out of the luminance signals outputted from the A/D converting circuit 16a, the right-eye information related to the odd field is stored in the memory MRo1 and the right-eye information related to the even field is stored in the memory MRe1. The left-eye information related to the odd field is stored in the memory MLo1 and the left-eye information related to the even field is stored in the memory MLe1. Out of the color difference signals outputted from the A/D converting circuits 16b and 16c, the right-eye information related to the odd field are stored in the memories MRo2 and MRo3, the right-eye information related to the even field are stored in the memories MRe2 and MRe3, the left-eye information related to the odd field are stored in the memories MLo2 and MLo3 and the left-eye information related to the even field are stored in the memories MLe2 and MLe3. For example, a memory μPD41254 manufactured by Nippon Electric Co., Ltd. of Japan may be used for the memories MRo1 through MRo3, MRe1 through MRe3, MLo1 through MLo3 and MLe1 through MLe3.

The multiplexer 55 controls the write-in to the memories MRo1, MLo1, MRe1 and MLe1. The multiplexer 56 controls the write-in to the memories MRo2, MLo2, MRo3, MLo3, MRe2, MLe2, MRe3 and MLe3. In addition, the multiplexer 57 controls the read-out from the memories MRo1, MLo1, MRe1 and MLe1. The multiplexer 58 controls the read-out from the memories MRo2, MLo2, MRo3, MLo3, MRe2, MLe2, MRe3 and MLe3.

Figure 4A:
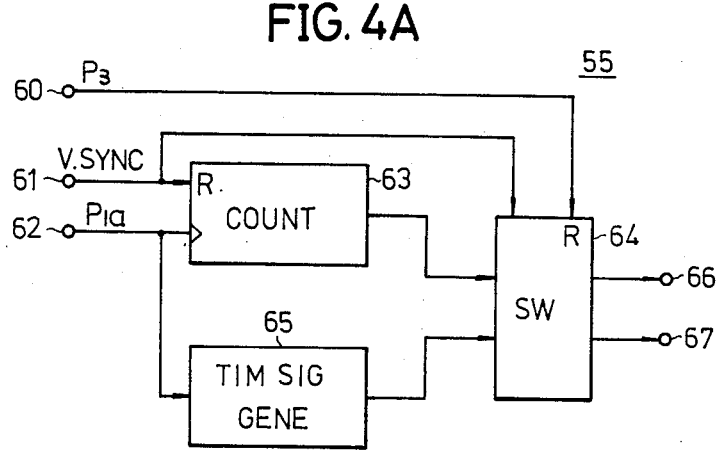
FIGS. 4A and 4B are system block diagrams respectively showing an embodiment of a multiplexer in the block system shown in FIG. 3.

The multiplexer 55 has a construction shown in FIG. 4A. In FIG. 4A, the reset pulses P3, the vertical synchronizing signal and the write-in pulses P1a from the read-out control circuit 13 are respectively applied to terminals 60, 61 and 62. A counter 63 is reset by the vertical synchronizing signal and counts the write-in pulses P1a. An address signal for the memory MRo1 and the like is produced from the counter 63 and is supplied to a switching circuit 64. A timing signal generator 65 frequency-divides the write-in pulses P1a and produces for every period of the write-in pulses P1a a timing signal which instructs a timing with which an address is entered and a timing with which a datum is entered in the memory MRo1 and the like. This timing signal is supplied to the switching circuit 64. When the switching circuit 64 is reset by one of the reset pulses P3, the switching circuit 64 supplies the incoming address signal and the timing signal to the memories MRo1 and MLo1 via a terminal 66. When the vertical synchronizing signal is thereafter supplied to the switching circuit 64, the switching circuit 64 supplies the incoming address signal and the timing signal to the memories MRe1 and MLe1 via a terminal 67.

The multiplexer 56 has a construction identical to that shown in FIG. 4A. In the case of the multiplexer 56, however, the write-in pulses P1b are applid to the terminal 62. The address signal and the timing signal from the terminal 66 are supplied to the memories MRo2, MRo3, MLo2 and MLo3. Furthermore, the address signal and the timing signal from the terminal 67 are supplied to the memories MRe2, MRe3, MLe2 and MLe3.

Accordingly, the right-eye information Ro related to the odd field are stored in the memories MRo1 through MRo3, and at the same time, the left-eye information Lo related to the odd field are stored in the memories MLo1 through MLo3. Next, the right-eye information Re related to the even field are stored in the memories MRe1 through MRe3, and at the same time, the left-eye information Le related to the even field are stored in the memories MLe1 through MLe3.

Figure 4B:
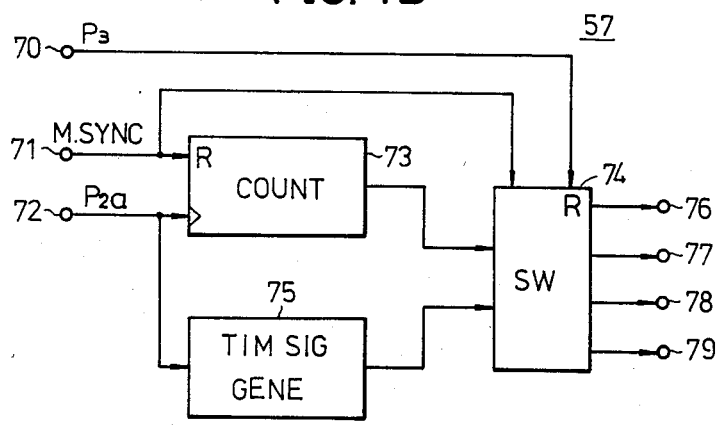

The multiplexer 57 has a construction shown in FIG. 4B. In FIG. 4B, the reset pulses P3, the main scanning direction synchronizing signal and the read-out pulses P2a from the read-out control circuit 13 are respectively applied to terminals 70, 71 and 72. A counter 73 is reset by the main scanning direction synchronizing signal and counts the read-out pulses P2a. An address signal for the memory MRo1 and the like is produced from the counter 73 and is supplied to a switching circuit 74. A timing signal generator 75 frequency-divides the read-out pulses P2a and produces for every period of the read-out pulses P2a a timing signal which instructs a timing with which an address is entered and a timing with which a datum is read out from the memory MRo1 and the like. This timing signal is supplied to the switching circuit 74. When the switching circuit 74 is reset by one of the reset pulses P3, the switching circuit 74 supplies the incoming address signal and the timing signal to the memory MRe1 via a terminal 76. Thereafter, every time the main scanning direction synchronizing signal is supplied to the switching circuit 74, the switching circuit 74 successively and selectively supplies the incoming address signal and the timing signal to the memories MLe1, MRo1 and MLo1 via terminals 77, 78 and 79, respectively.

The multiplexer 58 has a construction identical to that shown in FIG. 4B. In the case of the multiplexer 58, however, the read-out pulses P2b are applied to the terminal 72. The address signal and the timing signal from the terminal 76 are supplied to the memories MRe2 and MRe3. Furthermore, the address signal and the timing signal from the terminal 77 are supplied to the memories MLe2 and MLe3, the address signal and the timing signal from the terminal 78 are supplied to the memories MRo2 and MRo3, and the address signal and the timing signal from the terminal 79 are supplied to the memories MLo2 and MLo3.

Accordingly, after one of the reset pulses P3 is received, the right-eye information Re relates to the even field are read out from the memories MRe1 through MRe3, and then, the left-eye information Le related to the even field are read out from the memories MLe1 through MLe3, as shown in FIG. 5(D). Next, the right-eye information Ro related to the odd field are read out from the memories MRo1 through MRo3, and then, the left-eye information Lo related to the odd field are read out from the memories MLo1 through MLo3. The information related to the even field are first read out so that the write-in and read-out are not simultaneously performed with respect to each memory.

The D/A converter 18 comprises a D/A converting circuit 18a for the luminance signals, and D/A converting circuits 18b and 18c for the color difference signals. The D/A converting circuit 18a is supplied with the read-out pulses P2a of approximately 18 MHz from the read-out control circuit 13, and converts the information read out from the memories MRe1, MLe1, MRo1 and MLo1 into the luminance signals $Y_R$ and $Y_L$. The D/A converting circuits 18b and 18c are respectively supplied with the read-out pulses P2b of approximately 4.5 MHz from the read-out control circuit 13. The D/A converting circuit 18b converts the information read out from the memories MRe2, MLe2, MRo2 and MLo2 into the color difference signals $(R-Y)_R$ and $(R-Y)_L$. On the other hand, the D/A converting circuit 18c converts the information read out from the memories MRe3, MLe3, MRo3 and MLo3 into the color difference signals $(B-Y)_R$ and $(B-Y)_L$.

The 120 Hz main scanning direction synchronizing signal from the read-out control circuit 13 is supplied to a main scanning direction deflection circuit 23 of the display device 21 shown in FIG. 1, and electron beams modulated by the color signals $S_R$, $S_G$ and $S_B$ are deflected in the main scanning direction (vertical scanning direction). In addition, the 31.47 kHz sub scanning direction synchronizing signal from the read-out control circuit 13 is supplied to a sub scanning direction deflection circuit 24 of the display device 21, and the electron beams are deflected in the sub scanning direction (horizontal scanning direction).

In order to perform the scanning at the frequencies of 120 Hz and 31.47 kHz, the constants of the circuit parts in the deflection circuits 23 and 24 are different from the those of vertical and horizontal deflection circuits of a normal display device.

Figure 7:
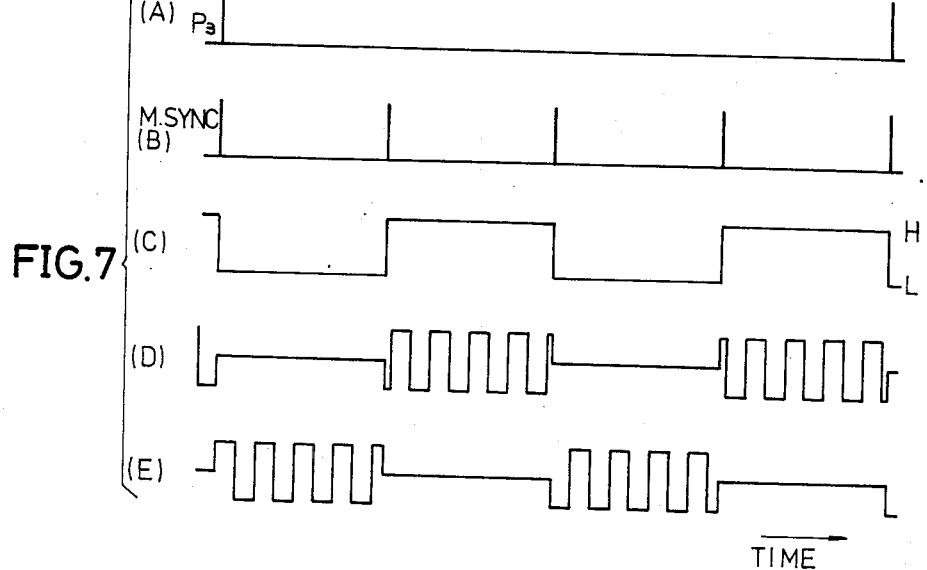
FIGS. 7(A) through 7(E) are timing charts for explaining an embodiment of signals obtained at parts of the circuit shown in FIG. 6.

The main scanning direction synchronizing signal and the reset pulses P3 from the read-out control circuit 13 are also supplied to a glasses driving circuit 25 shown in FIG. 1. The driving circuit 25 has a construction shown in FIG. 6. The reset pulses P3 having a waveform shown in FIG. 7(A) are applied to a terminal 80a and are supplied to a reset terminal R of a trigger type flip-flop 81. The main scanning direction synchronizing signal shown in FIG. 7(B) is applied to a terminal 80b and is supplied to a trigger terminal T of the flip-flop 81. The flip-flop 81 produces a gate signal shown in FIG. 7(C) having a frequency of 60 Hz. This gate signal is supplied to NAND circuits 82 and 83. On the other hand, this gate signal is inverted in an inverter 84 and is then supplied to NAND circuits 85 and 86. An oscillator 87 generates a square wave signal having a frequency of 1 kHz, and this square wave signal is supplied to the NAND circuits 83 and 85. Furthermore, this square wave signal is inverted in an inverter 88 and is then supplied to the NAND circuits 82 and 86. The NAND circuits 82 and 83 respectively pass the inverted square wave signal and the square wave signal only during the high-level period of the gate signal. On the other hand, the NAND circuits 85 and 86 respectively pass the square wave signal and the inverted square wave signal only during a low-level period of the gate signal. An output driving signal of the NAND circuit 83 having a waveform shown in FIG. 7(D) and an output inverted driving signal of the NAND circuit 82 are respectively outputted via terminals 90a and 90b and are supplied to a left-eye shutter 26a of shutter glasses 26. An output driving signal of the NAND circuit 85 having a waveform shown in FIG. 7(E) and an output inverted driving signal of the NAND circuit 86 are respectively outputted via terminals 91a and 91b and are supplied to a right-eye shutter 26b of the shutter glasses 26. The shutter glasses 26 comprise a balanced transformer less (BTL) circuit for the shutters 26a and 26b, and the shutters 26a and 26b are alternately opened and closed with a period of 1/60 second with which the driving signals are supplied thereto.

In the stereoscopic television apparatus having the construction described heretofore, the right-eye (or left-eye) information related to one field is reproduced with a period of 1/120 second, and the right-eye and left-eye information related to the odd field (or even field) are reproduced with a period of 1/60 second. In other words, according to the stereoscopic television apparatus of the present invention, the right-eye information Re related to the even field, the left-eye information Le related to the even field, the right-eye information Ro related to the odd field and the left-eye information Lo related to the odd field are successively reproduced with a period of 1/120 second.

Accordingly, the right-eye information Ro and Re are alternately supplied to the right eye of the viewer with a period of 1/60 second, and the left-eye information Lo and Le are alternately supplied to the left eye of the viewer with a period of 1/60 second. Generally, the human eyes cannot detect a flicker when an ON-and-OFF period is in the order of 1/60 second. For this reason, it is possible to prevent the generation of flicker according to the present invention.

The shutters 26a and 26b of the shutter glasses 26 are alternately opened and closed in synchronism with the main scanning direction synchronizing signal. Hence, when the viewer wears the shutter glasses 26, only the reproduced picture of the left-eye information signal S1 is supplied to the left eye and only the reproduced picture of the right-eye information signal S2 is supplied to the right eye.

Figure 8:
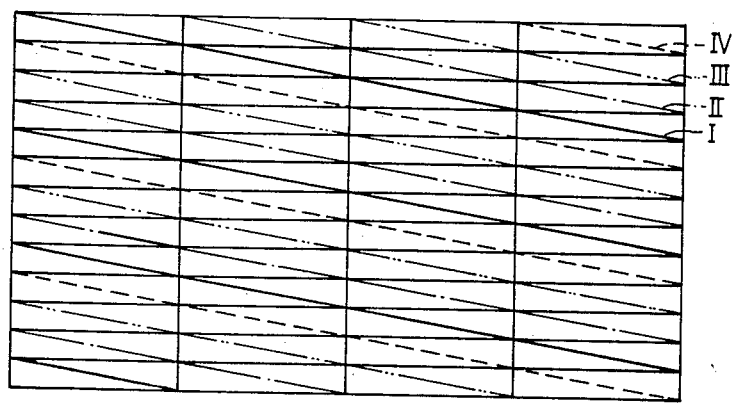
FIG. 8 is a diagram for explaining rasters obtained by the stereoscopic television apparatus according to the present invention.

According to the present embodiment of the stereoscopic television apparatus of the present invention, the information are reproduced in the sequence of the right-eye information Re related to the even field, the left-eye information Le related to the even field, the right-eye information Ro related to the odd field and the left-eye information Lo related to the odd field. In addition, the number of scanning lines in the sub scanning direction in one period of the main scanning direction synchronizing signal is $262.5-\frac{1}{4}$. Hence, as shown in FIG. 8, the right-eye information R related to the even field is displayed in a raster as indicated by a solid line I, the left-eye information Le related to the even field is then displayed in a raster as indicated by a one-dot chain line II, the right-eye information Ro relates to the odd field is then displayed in a raster as indicated by a two-dot chain line III, and the left-eye information Lo related to the odd field is thereafter displayed in a raster as indicated by a phantom line IV. For this reason, a raster interval between the raster of the right-eye information of each field and the raster of the left-eye information of each field can be made $\frac{1}{2}$ the raster interval of the system which employs 525 scanning lines in one frame. Furthermore, the interlacing of the picture information with respect to the right and left eyes can be accurately maintained. As a result, when the right-eye information and the left-eye information of each of the odd and even fields are successively reproduced, it is possible to minimize the deviation between the display position of the right-eye information and the display position of the left-eye information in the main scanning direction. Moreover, it is possible to supply to the right and left eyes of th viewer all of the right-eye information and the left-eye information, respectively, and the apparent picture quality of the reproduced picture can be improved.

In a general television receiver, the starting position of the raster is shifted in the horizontal direction by $\frac{1}{2}$ horizontal scanning line for every one field. If the right-eye information and the left-eye information were to be displayed on such a general television receiver, the rasters of the reproduced pictures obtained from the right-eye information Ro and Re will always be started from the top left of the screen, and the rasters of the reproduced pictures obtained from the left-eye information Lo and Le will always be started from the top center of the screen. As a result, although the information signals S1 and S2 are perfectly synchronized with each other and the two video information which are supplied are related to the same object and were picked up at the same point in time, the raster interval between the raster of the right-eye information and the raster of the left-eye information in the reproduced picture will deviate in the horizontal scanning direction by ½ the horizontal scanning line. For this reason, when the right-eye information picked up at a certain point in time is displayed from the top left of the screen, the left-eye information picked up at this certain point in time is displayed from the top center of the screen, and although these right-eye information and left-eye information are related to the same object and were picked up at the same point in time, the display positions of the right-eye information and the left-eye information mutually deviate in the vertical direction to thereby deteriorate the picture quality of the reproduced picture.

On the other hand, according to the present invention, the mutual deviation between the display positions of the right-eye information and left-eye information in the main scanning direction can be reduced to ½ that of the conventional system. Therefore, the viewer can detect no unnatural movements between the reproduced picture supplied to the right eye and the reproduced picture supplied to the left eye, and it is possible to improve the apparent picture quality of the reproduced picture.

In the present embodiment, the field memory 17 is designed to store and process the luminance signals Y and the color difference signals R−Y and B−Y. However, the field memory 17 is not limited to that described in the embodiment, and for example, the field memory 17 may be designed to store and process color signals $S_R$, $S_G$ and $S_B$ of red (R), green (G) and blue (B), respectively, or the luminance signals Y and chrominance signals C.

Further, the present invention is not limited to these embodiments, but various variations and modifications may be made without departing from the scope of the present invention.

What is claimed is:

1. A stereoscopic television system for reproducing a stereoscopic picture which is viewed through shutter glasses having right and left shutters which are alternately opened and closed with a predetermined period, said stereoscopic picture being made up of a sequence of right-eye information and left-eye information which are alternately reproduced with said predetermined period, said stereoscopic television system comprising:
    memory means for storing right-eye information related to odd and even fields and left-eye information related to the odd and even fields;
    synchronizing signal producing means for producing a main scanning direction synchronizing signal for synchronizing a scanning in a vertical direction of a reproduced picture and a sub scanning direction synchronizing signal for synchronizing a scanning in a horizontal direction of the reproduced picture, where said sub scanning direction synchronizing signal has a frequency which is m±¼ times a frequency of said main scanning direction synchronizing signal and m is a natural number; and
    display means for reproducing and displaying in synchronism with said main and sub scanning direction synchronizing signals the right-eye information related to the odd and even fields and the left-eye information related to the odd and even fields which are successively read out from said memory means in synchronism with said main scanning direction synchronizing signal.

2. A stereoscopic television system as claimed in claim 1 in which said synchronizing signal producing means produces a sub scanning direction synchronizing signal having a frequency which is (262+¼) times the frequency of said main scanning direction synchronizing signal.

3. A stereoscopic television system as claimed in claim 1 in which said main scanning direction synchronizing signal has a period of 1/120 second.

4. A stereoscopic television apparatus for reproducing a stereoscopic picture which is viewed through shutter glasses having right and left shutters which are alternately opened and closed with a predetermined period, said stereoscopic picture being made up of a sequence of right-eye information and left-eye information which are alternately reproduced with said predetermined period, said stereoscopic television apparatus comprising:
    memory means for independently storing right-eye information related to an odd field, right-eye information related to an even field, left-eye information related to the odd field and left-eye information related to the even field;
    write-in means for writing the right-eye information and the left-eye information which are supplied thereto in parallel into the memory means for each of the odd and even fields;
    synchronizing signal producing means for producing a main scanning direction synchronizing signal for synchronizing a scanning in a vertical direction of a reproduced picture and a sub scanning direction synchronizing signal for synchronizing a scanning in a horizontal direction of the repeoduced picture, where said main scanning direction synchronizing signal has a frequency which is two times a frequency of a vertical synchronizing signal of the right-eye information and the left-eye information, a number of periods of said sub scanning direction synchronizing signal in one period of said main scanning direction synchronizing signal is equal to a number of periods of a horizontal synchronizing signal in one period of the vertical synchronizing signal plus or minus (2n−1)/4 and n is a natural number;
    read-out means for successively and serially reading out from said memory means in synchronism with said main scanning direction synchronizing signal the right-eye information and the left-eye information related to an even field or an odd field during a time period in which the right-eye information and the left-eye information related to an odd field or an even field are written into said memory means; and
    display means for reproducing and displaying in synchronism with said main and sub scanning direction synchronizing signals the right-eye information and the left-eye information which are successively read out from said memory means.

5. A stereoscopic television apparatus as claimed in claim 4 in which said read-out means successively and serially reads out from said memory means right-eye information and left-eye information related to an even field or an odd field during a time period in which the right-eye information and the left-eye information related to an odd field or an even field are written into the memory means in parallel.

6. A stereoscopic television apparatus as claimed in claim 4 in which the right-eye information and the left-eye information stored in said memory means respectively include a luminance information and two kinds of color difference information.

7. A stereoscopic television apparatus as claimed in claim 4 in which said synchronizing signal producing means produces a sub scanning direction synchronizing signal so that a number of periods of said sub scanning direction synchronizing signal in one period of said main scanning direction synchronizing signal is equal to a number of periods of the horizontal synchronizing signal in one period of the vertical synchronizing signal minus $\frac{1}{4}$.

8. A stereoscopic television apparatus as claimed in claim 4 in which the number of periods of said sub scanning direction synchronizing signal in one period of said main scanning direction synchronizing signal is equal to $262 + \frac{1}{4}$.

9. A stereoscopic television apparatus as claimed in claim 4 in which said main scanning direction synchronizing signal has a period of 1/120 second.

10. A stereoscopic television apparatus as claimed in claim 4 in which said synchronizing signal producing means produces the main scanning direction synchronizing signal by frequency-multiplying the vertical synchronizing signal by use of a phase locked loop.

11. A stereoscopic television apparatus as claimed in claim 4 in which said synchronizing signal producing means produces the sub scanning direction synchronizing signal by frequency-multiplying the vertical synchronizing signal by use of a phase locked loop.

* * * * *